United States Patent
Boddu et al.

[11] Patent Number: 5,974,511
[45] Date of Patent: Oct. 26, 1999

[54] CACHE SUBSYSTEM WITH PSEUDO-PACKET SWITCH

[75] Inventors: Jayabharat Boddu, Santa Clara; Jui-Cheng Su, Sunnyvale, both of Calif.

[73] Assignee: Sun Microsystems, Inc., Palo Alto, Calif.

[21] Appl. No.: 08/828,470

[22] Filed: Mar. 31, 1997

[51] Int. Cl.⁶ .................................................. G06F 12/00
[52] U.S. Cl. .......................... 711/146; 711/141; 711/143; 711/144
[58] Field of Search .................... 711/146, 141, 711/143, 144

[56] References Cited

U.S. PATENT DOCUMENTS

| | | | |
|---|---|---|---|
| 5,072,369 | 12/1991 | Theus et al. | 711/146 |
| 5,353,415 | 10/1994 | Wolford et al. | 395/306 |
| 5,524,233 | 6/1996 | Milburn et al. | 395/468 |
| 5,557,769 | 9/1996 | Bailey et al. | 711/146 |
| 5,630,094 | 5/1997 | Hayek et al. | 711/146 |
| 5,761,725 | 6/1998 | Zeller et al. | 711/146 |

*Primary Examiner*—John W. Cabeca
*Assistant Examiner*—Mehdi Namazi
*Attorney, Agent, or Firm*—The Gunnison Law Firm

[57] ABSTRACT

A host includes a bus cache, a L1 cache and an enhanced snoop logic circuit to increase bandwidth of peripheral bus during a memory access transaction. When a device connected to the peripheral bus starts a memory read transaction, the host converts the virtual address of the memory read transaction to a physical address. The snoop logic circuit checks to see whether the physical address is in the bus cache and, if so, whether the data in the bus cache corresponding to address is valid. If there is a bus cache hit, the corresponding data is accessed from the bus cache and output onto the peripheral bus. However, if the snoop logic circuit does not find the physical address in the bus cache or finds that the data is invalid, the snoop logic circuit causes (1) the peripheral bus interface unit to perform a retry operation on the peripheral bus and (2) the cache controller to process a memory request to retrieve the requested data from the L1 cache, L2 cache (if any) or the main memory and store the requested data into the bus cache. In addition, when the device retries the memory read request, the bus cache will have the requested data so that the data can be immediately provided to the peripheral bus. Thus, in memory read transactions longer than a cache line, the data is provided on the peripheral bus in a pseudo-packet switched manner.

28 Claims, 3 Drawing Sheets

CACHE SUBSYSTEM WITH PSEUDO-PACKET SWITCH

FIELD OF THE INVENTION

The present invention relates to memory access circuits and, more specifically, to memory access circuits for use in bus transfers.

BACKGROUND processor-based electronic systems generally include a processor, a memory and one or more devices external to the processor. Typically, the devices communicate with the processor through an external bus. In some of these systems, one or more of these external devices can access the memory. FIG. 1 is a block diagram of an exemplary system 100 in which external devices may access the memory. The system 100 includes a host or processor 102 with an internal or "level one" cache 104. The host 102 is also connected to an external or "level two" cache 106 and a main memory 108. The level one cache 104, the level two cache 106 and the main memory 108 form part of the memory 110 for the system 100.

The host 102 is connected to a bus 120. Several devices $122_1$–$122_N$ are also connected to the bus 120. In this conventional system, the devices $122_1$–$122_N$ may access the memory 110 via the bus 120. In many conventional bus protocols, memory access transactions by an external device "stalls" the bus 120 until the memory access transaction completes. This type of bus protocol is referred to herein as a connection-oriented bus protocol such as, for example, the peripheral component interface (PCI) local bus protocol. For example, using the PCI local bus protocol in the system 100, if a memory read transaction by the external device $122_1$ causes a cache miss (i.e., misses the caches 104 and 106), the host 102 must make a memory request from the main memory 108. As a result, the host 102 is required to provide wait states on the bus 120 while accessing the main memory 108, delaying the bus transaction. This delay, referred to herein as host initial data latency, in receiving a first data word in response to a memory read request after a cache miss typically causes a significant decrease in the bandwidth of the bus 120.

In addition to a standard cache miss, because the PCI local bus protocol allows burst memory transactions of unlimited length, memory access transactions may cross a cacheline boundary. A memory transaction that crosses a cacheline boundary typically causes a cache miss so that cache coherency can be maintained. Consequently, due to the host initial data latency, memory access transactions that cross a cacheline boundary also significantly decrease the bandwidth of the bus 120. Accordingly, there is a need for a memory access circuit that avoids the above host initial data latency problem, thereby increasing the bandwidth of the bus 120 during memory access transactions.

SUMMARY

In accordance with the present invention, a method and apparatus to increase bandwidth of memory access transactions in connection-oriented bus protocols is provided. In one embodiment, a host processor (host) is connected to a host bus and a peripheral bus, such as a PCI local bus. The host includes a bus cache, a level one (L1) cache, a snoop logic circuit, a translation look-aside buffer (TLB) and a cache controller. The host interacts with a main memory and, optionally, a level two (L2) cache through the host bus. The host interacts with external devices such as disk drives and keyboards, for example, through the peripheral bus. These devices may be able to make memory read transaction requests on the peripheral bus to access the memory (i.e., the cache memory and main memory) through the host.

In this embodiment, when a device connected to the peripheral bus starts a memory read transaction, the host converts the virtual address of the memory read transaction to a physical address. The snoop logic circuit checks to see whether the physical address is in the bus cache and, if so, whether the data in the bus cache corresponding to the phusical address is valid. If there is a bus cache hit, the corresponding data is accessed from the bus cache and output onto the peripheral bus. However, if the snoop logic circuit does not find the physical address in the bus cache or finds that the data is invalid, the snoop logic circuit causes (1) the peripheral bus interface unit to perform a retry operation on the peripheral bus and (2) the cache controller to process a memory request to retrieve the requested data from the L1 cache, L2 cache (if any) or the main memory and store the requested data into the bus cache. Unlike conventional systems which must complete the memory read transaction, the retry operation frees the peripheral bus for other transactions, thereby increasing the bandwidth of the peripheral bus. In addition, when the device retries the memory read request, the bus cache has the requested data so that the data can be immediately provided to the peripheral bus.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 2:
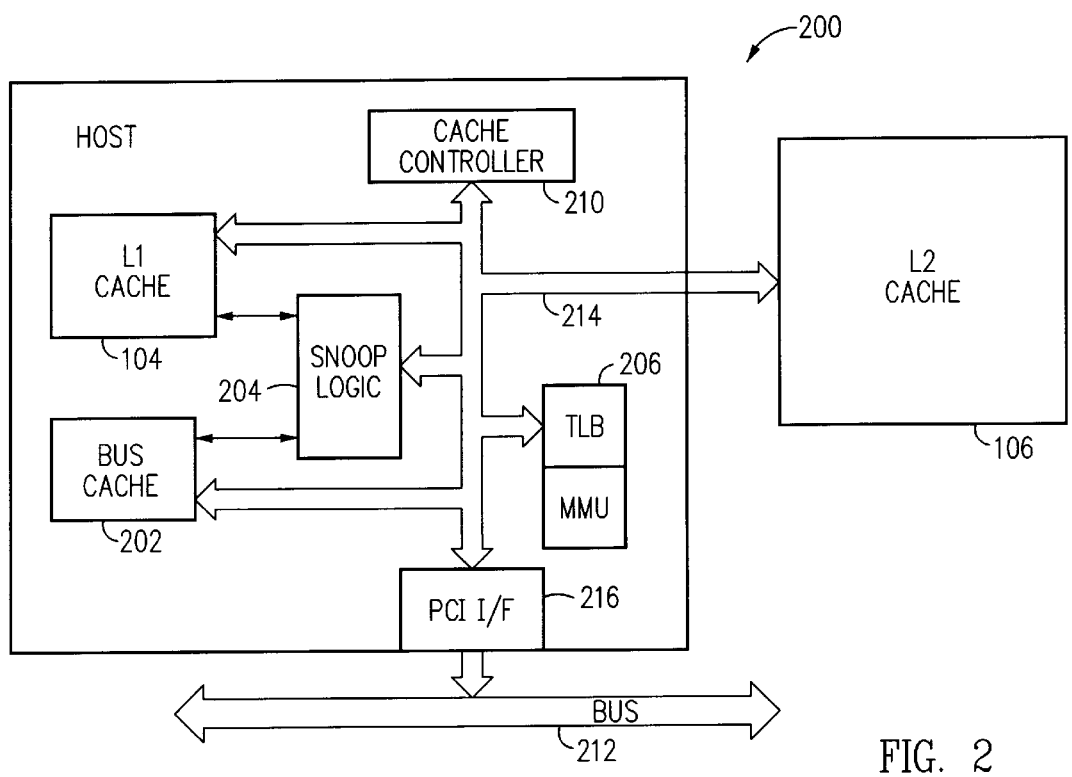
FIG. 2 is a block diagram of a host having a bus cache, in accordance with one embodiment of the present invention.

FIG. 2 is a block diagram of a host 200 configured to increase the bandwidth of memory access transactions of a PCI bus systems, in accordance with one embodiment of the present invention. In this embodiment, the host 200 is a standard Sparc®-type processor configured with the present invention, although the present invention may be incorporated into any suitable processor. For example, the present invention may also be incorporated into X86, Alpha®, MIPS®, HP®, Pentium® and PowerPC® processors.

Figure 1:
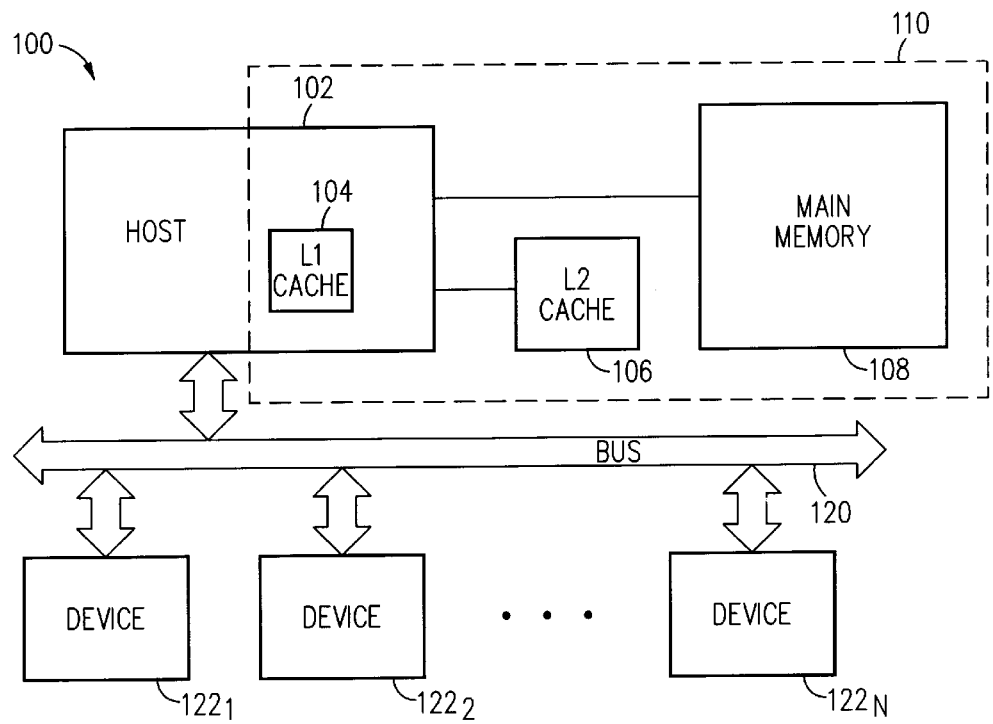
FIG. 1 is a block diagram of a conventional computer system having devices that can access the memory subsystem.

The host 200 also includes a bus cache 202, a snoop logic circuit 204, a conventional translation look-aside buffer (TLB) 206, the conventional L1 cache 104, and a conventional cache controller 210. The host 200 communicates with devices (e.g., devices $122_1$–$122_N$ in FIG. 1) through a peripheral bus 212. In this embodiment, the bus 212 is a PCI local bus, the specification of which (available through the PCI Special Interest Group, Portland, Oreg.) is incorporated herein by reference. The host 200 also communicates to the main memory (not shown) and the optional L2 cache 106 through a conventional memory bus 214, which is also connected to the L1 cache 104, the snoop logic circuit 204, the bus cache 202, the TLB 206 and the cache controller 210. The host also includes a conventional PCI interface 216 connected to the memory bus 214 for coupling the host to the PCI bus 212.

The bus cache 202 is implemented in a manner similar to conventional caches, except that in this embodiment, the bus cache 202 is dedicated to memory-mapped I/O transactions on the PCI bus 212. The bus cache 202 is connected to the memory bus 214 and to the snoop logic circuit 204. The snoop logic circuit 204 is similar to conventional snoop logic circuits, except that the snoop logic circuit 204 is enhanced to snoop the bus cache 202. The snoop logic circuit 204 is therefore also connected to the L1 cache 104 and snoops the L1 cache 104 in a conventional manner. For example, U.S. Pat. No. 5,524,233 issued to Milburn et al. describes snooping, and is incorporated herein by reference. The cache controller 210 maintains the consistency of the L1 cache 104 in a conventional manner. The TLB 206, which is part of the memory management unit (MMU) translates virtual addresses to physical addresses in the conventional manner. In an alternative embodiment, the TLB 206 can be external to the MMU to allow the TLB to operate concurrently with the MMU to enhance bandwidth. This option is described further below in conjunction with FIG. 5.

Figure 3:
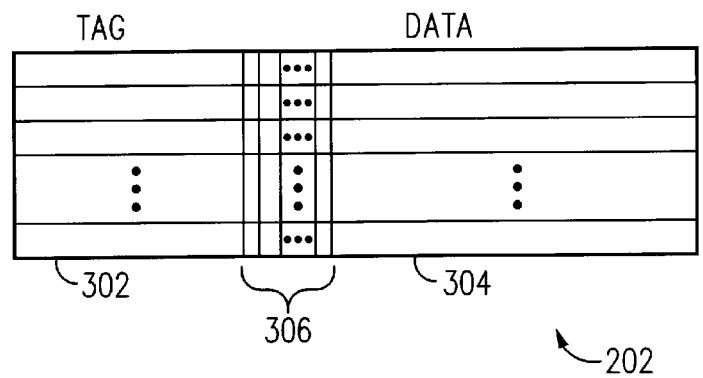
FIG. 3 is a block diagram of the bus cache depicted in FIG. 2, in accordance with one embodiment of the present invention.

FIG. 3 is a block diagram of the bus cache 202 (FIG. 2), in accordance with one embodiment of the present invention. Similar to a conventional cache, the bus cache 202 includes a tag section 302 and data section 304. The tag section 302 is implemented with a content addressable memory (CAM), whereas the data section 304 is implemented with a conventional static random access memory (SRAM). The tag section also includes cache coherency or consistency bits 306, which are set or reset in a conventional manner to indicate the status/validity of the contents of the bus cache 202. For example, the cache consistency bits 306 may include the MESI protocol described in the aforementioned Milburn patent.

Figure 4:
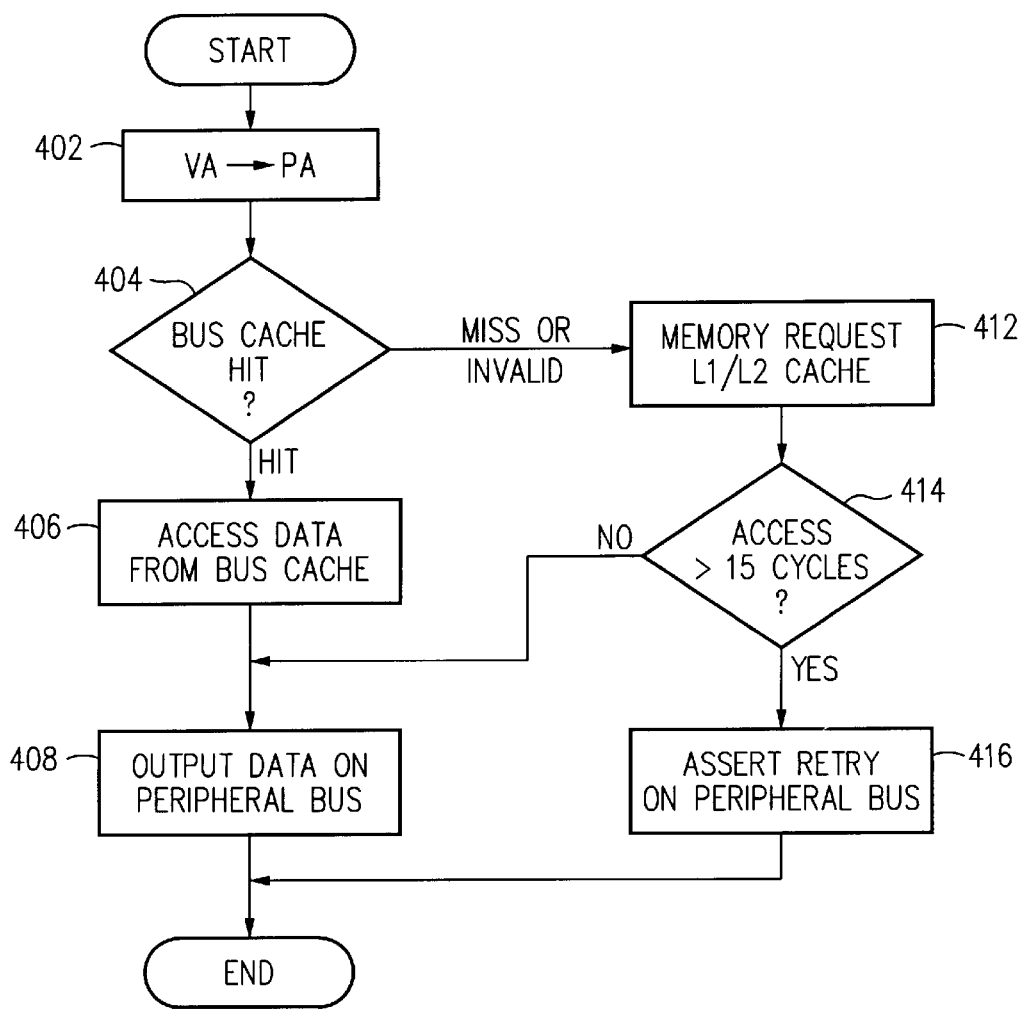
FIG. 4 is a flow chart illustrative of the operation of the host depicted in FIG. 2 during a memory read transaction initiated from the peripheral bus.

FIG. 4 is a flow chart illustrative of the operation of the host 200 (FIG. 2) during a memory read transaction initiated by a device(not shown) on the PCI bus 212. With reference to FIGS. 2 and 4, upon receiving a memory read request from the PCI bus, the TLB 206 performs a step 402 to translate the virtual address of the memory read transaction to a physical address. In a step 404, the snoop logic circuit 204 checks the bus cache 202 for the requested virtual address. If the address is present and valid in the bus cache 202, the bus cache 202 is accessed for the data corresponding to the requested address in a step 406. In a step 408, the data is provided onto the PCI bus 212 through the PCI interface 216.

However, if in the step 404 a cache miss results or the requested address is invalid (e.g., the requested address crosses a cache line), in this embodiment a step 412 is performed in which the snoop logic circuit 204 causes the cache controller 210 to make a memory request to find the requested data. In a next step 414, the snoop logic circuit 204 monitors the memory request to determine whether the request is completed within fifteen PCI bus cycles. If the data is available within fifteen PCI bus cycles, the step 408 is performed as described above to provide the retrieved data onto the PCI bus 212. Typically, this branch will occur when the L1 cache 104 contains the requested data.

Otherwise, in a next step 416, the snoop logic circuit 204 causes the PCI interface 216 to assert a retry operation on the PCI bus 212, while the memory request transaction on the memory bus continues. The memory management unit MMU causes the requested data that are retrieved from the L2 cache 106 or main memory (not shown) to be loaded into the bus cache 202 in a manner that is well known in the art of cache subsystems. As a result of asserting retry on the PCI bus 212, the host 200 frees the PCI bus 212 for other bus masters (not shown) to conduct transactions while concurrently accessing the requested data on the memory bus. In contrast, conventional systems typically insert wait cycles on the PCI bus until the memory read transaction completes. Thus, the PCI bus sits idle while the L2 cache 106 (and possibly main memory) is checked for the requested data. This delay can be significant. However, because in this embodiment of the present invention the memory read transaction on the PCI bus is not required to complete, the PCI bus can be used for other transactions by other devices, thereby increasing the bandwidth on the PCI bus. In addition, because the memory transaction on the memory bus is performed concurrently with the retry (and any subsequent transactions on the PCI bus), when the device retries the memory read request (in accordance with the aforementioned PCI local bus specification), the data is guaranteed to be in the bus cache 202. Thus, in the case of memory read transactions longer than a cache line size, the data is provided to the PCI bus 212 in a pseudo-packet switched manner.

Figure 5:
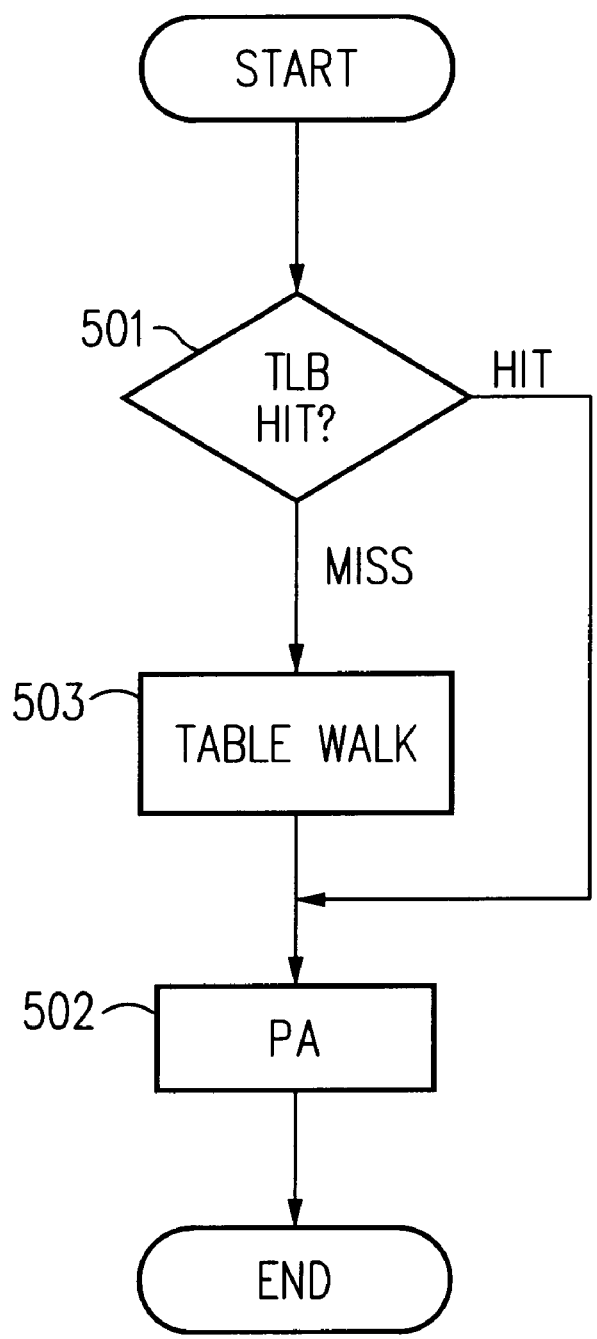
FIG. 5 is a flow chart illustrative of the virtual address to physical address translation.

FIG. 5 is a flow chart of the virtual address to physical address translation described in the step 402 (FIG. 4). In a step 501, the memory management unit determines whether the physical address corresponding to the virtual address is stored in the TLB 206. If the TLB 206 does have the physical address, then the memory management unit provides the physical address to the snoop logic circuit 204 (FIG. 2). However, if the TLB 206 does not store the corresponding physical address, the TLB 206 performs a standard table walk in a next step 503 to find the physical address corresponding to the virtual address. If the TLB 206 is not part of the memory management unit, the TLB 206 can operate concurrently with the memory management unit to further enhance bandwidth. In particular, the TLB 206 can search whether a physical address is stored in the TLB while the memory management unit services other memory transactions.

The embodiments of the host with bus cache and method of this invention described above are illustrative of the principles of this invention and are not intended to limit the invention to the particular embodiments described. For example, while the embodiments described are configured for use in a PCI bus system, other embodiments can be adapted by those skilled in the art of cache systems for use with other connection oriented bus protocols. Accordingly, while the preferred embodiment of the invention has been illustrated and described, it will be appreciated that in light of the present disclosure various changes can be made to the described embodiments without departing from the spirit and scope of the invention.

The embodiments of the invention in which an exclusive property or privilege is claimed are defined as follows:

1. A processor coupled to a peripheral bus and a memory bus, the processor comprising:

a bus interface unit coupled to the peripheral bus and the memory bus;

a bus cache coupled to said bus interface unit, wherein said bus cache is configured to store at least one address and data corresponding to said at least one address; and a snoop logic circuit coupled to said bus cache and said bus interface unit, wherein said snoop logic circuit is configured to:
  detect an address of a read transaction received by the processor from a device connected to the peripheral buss and determine whether said address Qf said read transaction and the corresponding data are stored in said bus cache,
  cause said bus cache to provide said corresponding data to said bus interface unit when said bus cache stores said address of said read transaction, and
  cause said bus interface unit to assert a retry operation on said peripheral bus when said bus cache does not store said address of said read transaction.

2. The processor of claim 1 wherein said snoop logic circuit is further configured to wait a predetermined number of cycles on said peripheral bus before causing said retry operation.

3. The processor of claim 1 wherein said peripheral bus is a PCI local bus.

4. The processor of claim 1 further comprising a L1 cache coupled to said snoop logic circuit and said memory bus.

5. The processor of claim 4 further comprising a cache controller coupled to said memory bus.

6. A processor coupled to a peripheral bus and a memory bus, the processor comprising:
  a bus interface unit coupled t the peripheral bus and the memory bus;
  a bus cache coupled to said bus interface unit, wherein said bus cache is configured to store at least one address and data corresponding to said at least one address; a L1 cache coupled to said memory bus;
  a snoop logic ciruit coupled to said bus cache, to said L1 cache, and to said bus interface unit, wherein said snoop logic circuit is configured to:
    detect an address of a read transaction received by the processor from a device connected to the peripheral bus, and determine whether said address of said read transaction and the corresponding data are stored in said bus cache,
    cause said bus cache to provide said corresponding data to said bus interface unit when said bus cache stores said address of said read transaction, and
    cause said bus interface unit to assert a retry operation on said peripheral bus when said bus cache does not store said address of said read transaction; and
  a cache controller coupled to said memory bus wherein said cache controller checks said L1 cache for said address of said read transaction when said retry operation is asserted.

7. The processor of claim 6 wherein data corresponding to said requested address of said read transaction is loaded into said bus cache after said retry operation is asserted.

8. The processor of claim 7 wherein said bus cache contains said requested address of said read transaction when the device coupled to the peripheral bus retries the read transaction.

9. The processor of claim 1 wherein said snoop logic circuit is further configured to perform a retry operation on said peripheral bus when said bus cache stores said address of said read transaction and said corresponding data is invalid.

10. The processor of claim 9 wherein said data is invalid because said read transaction crosses a cache line.

11. A computer system comprising:
  a peripheral bus;
  a memory bus; and
  a processor coupled to the peripheral bus and the memory bus, said processor including:
    a bus interface unit coupled t the peripheral bus and the memory bus;
    a bus cache coupled to said bus interface unit, wherein said bus cache is configured to store at least one address and data corresponding to said at least one address; and
    a snoop logic circuit coupled to said bus cache and said bus interface unit, wherein said snoop logic circuit is configured:
      to detect an address of a read transaction received by the processor from a device connected to the peripheral bus, and to determine whether said address of said read transaction and the corresponding data are stored in said bus cache,
      to cause said bus cache to provide said corresponding data to said bus interface unit when said bus cache stores said address of said read transaction, and
      to cause said bus interface unit to assert a retry operation on said peripheral bus when said bus cache does not store said address of said read transaction.

12. The computer system of claim 11 wherein said snoop logic circuit is further configured to wait a predetermined number of cycles on said peripheral bus before causing said retry operation.

13. The computer system of claim 11 wherein said peripheral bu s is a PCI local bus.

14. The computer system of claim 11 further comprising a L1 cache coupled to said snoop logic circuit and said memory bus.

15. The computer system of claim 14 further comprising a cache controller coupled to said memory bus.

16. A computer system comprising:
  a peripheral bus;
  a memory bus;
  a L1 cache coupled a to said memory bus;
  a processor coupled to the peripheral bus and the memory bus, said processor including:
    a bus interface unit coupled t the peripheral bus and the memory bus;
    a bus cache coupled to said bus interface unit, wherein said bus cache is configured to store at least one address and data corresponding to said at least one address; and
    a snoop logic circuit coupled to said bus cache, said L1 cache, and said bus interface unit, wherein said snoop logic circuit is configured:
      to detect an address of a read transaction received by the processor from a device connected to the peripheral bus, and to determine whether said address of said read transaction and the corresponding data are stored in said bus cache,
      to cause said bus cache to provide said corresponding data to said bus interface unit when said bus cache stores said address of said read transaction, and
      to cause said bus interface unit to assert a retry operation on said peripheral bus when said bus cache does not store said address of said read transaction; and
  a cache controller coupled to said memory bus wherein said cache controller checks said L1 cache for said address of said read transaction when said retry operation is asserted.

17. The computer system of claim 16 wherein data corresponding to said requested address of said read transaction is loaded into said bus cache after said retry operation is asserted.

18. The computer system of claim 17 wherein said bus cache contains said requested address of said read transaction when the device coupled to the peripheral bus retries the read transaction.

19. The computer system of claim 11 wherein said snoop logic circuit is further configured to perform a retry operation on said peripheral bus when said bus cache stores said address of said read transaction and said corresponding data is invalid.

20. The computer system of claim 19 wherein said data is invalid because said read transaction crosses a cache line.

21. A method of increasing the bandwidth of a peripheral bus during memory access transactions requested by a device on the peripheral bus from a host connected to the peripheral bus, the method comprising:

receiving by the host an address of a memory access transaction;

determining whether a bus cache is storing said address;

providing data corresponding to said address from the bus cache to the peripheral bus when said bus cache is storing said address; and asserting a retry operation on the peripheral bus when the bus cache does not store said address.

22. The method of claim 21 further comprising requesting a memory transaction on a memory bus of said host when said bus cache does not store said address, wherein said memory request provides data corresponding to said address to be loaded into said bus cache.

23. The method of claim 21 further comprising asserting a retry operation on the peripheral bus when the bus cache is storing said address but data corresponding to said address is invalid.

24. The method of claim 23 wherein said data is invalid because the address crosses a cache line.

25. An apparatus for increasing the bandwidth of a peripheral bus during memory access transactions requested by a device on the peripheral bus from a host connected to the peripheral bus, the apparatus comprising:

means for receiving in the host an address of a memory access transaction requested by the device;

a bus cache;

means for determining whether the bus cache is storing said address;

means for providing data corresponding to said address from the bus cache to the peripheral bus when the bus cache is storing said address; and means for asserting a retry operation on the peripheral bus when the bus cache does not store said address and when said address is invalid.

26. The apparatus of claim 25 further comprising means for requesting a memory transaction on a memory bus of said host when said bus cache does not store said address, wherein said memory request provides data corresponding to said address to be loaded into said bus cache.

27. The apparatus of claim 25 further comprising means for asserting a retry operation on the peripheral bus when the bus cache is storing said address but data corresponding to said address is invalid.

28. The apparatus of claim 27 wherein said data is invalid because the address crosses a cache line.

* * * * *

UNITED STATES PATENT AND TRADEMARK OFFICE
CERTIFICATE OF CORRECTION

PATENT NO.   : 5,974,511
DATED        : October 26, 1999
INVENTOR(S)  : Jayabharat Boddu and Jui-Cheng Su It is certified that error appears in the above-identified patent and that said Letters Patent is hereby corrected as shown below:

Column 4,
Lines 64-65, delete "and the memory bus" and substitute "and to the memory bus".

Column 5,
Line 6, delete "buss" and substitute "bus".
Line 6, delete "Qf" and substitute "of".
Line 27, delete "t the" and substitute "to the".
Line 27, delete "and the" and substitute "and to the".

Column 6,
Line 4, "t the" and substitute "to the".
Line 4, "and the" and substitute "and to the".
Line 31, "bu s" and substitute "bus".
Line 43, "t the" and substitute "to the".
Line 43, "and the" and substitute "and to the".

Signed and Sealed this

Thirtieth Day of July, 2002

Attest:

JAMES E. ROGAN
Attesting Officer     Director of the United States Patent and Trademark Office